Dec. 21, 1937.  A. V. WEASLER ET AL  2,102,815
GRILLE GUARD
Filed March 24, 1937  2 Sheets-Sheet 1
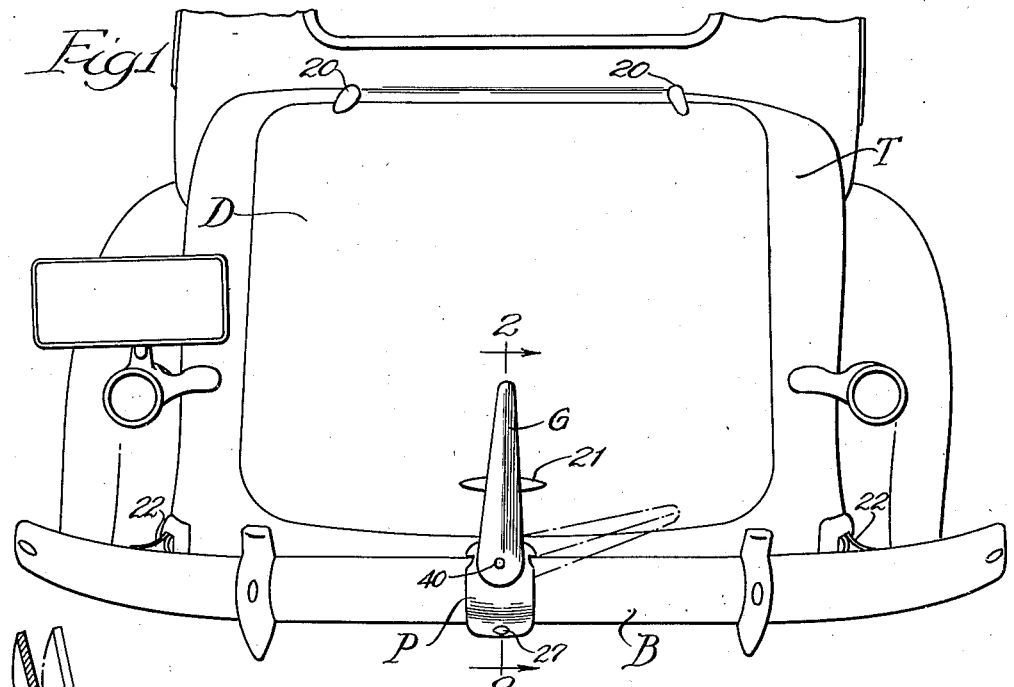
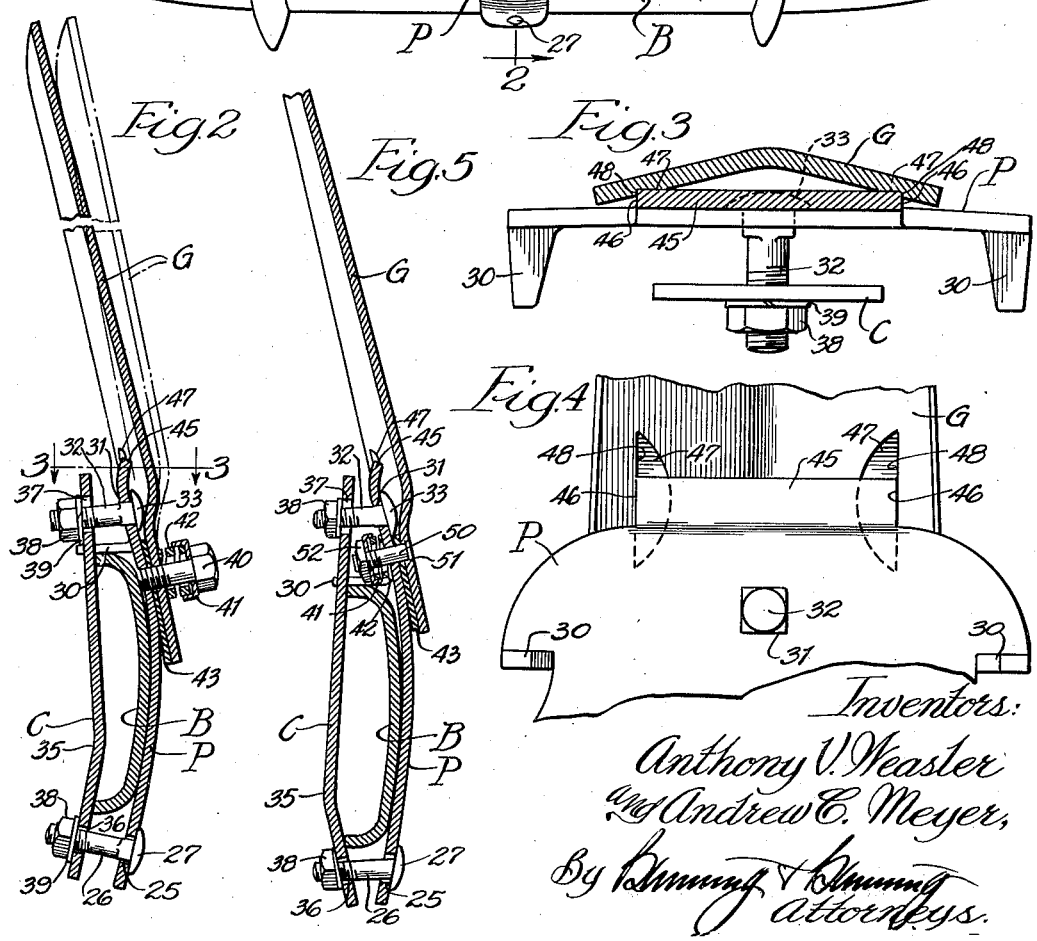
Inventors:
Anthony V. Weasler
and Andrew C. Meyer,
By Shunny & Shunny
Attorneys.

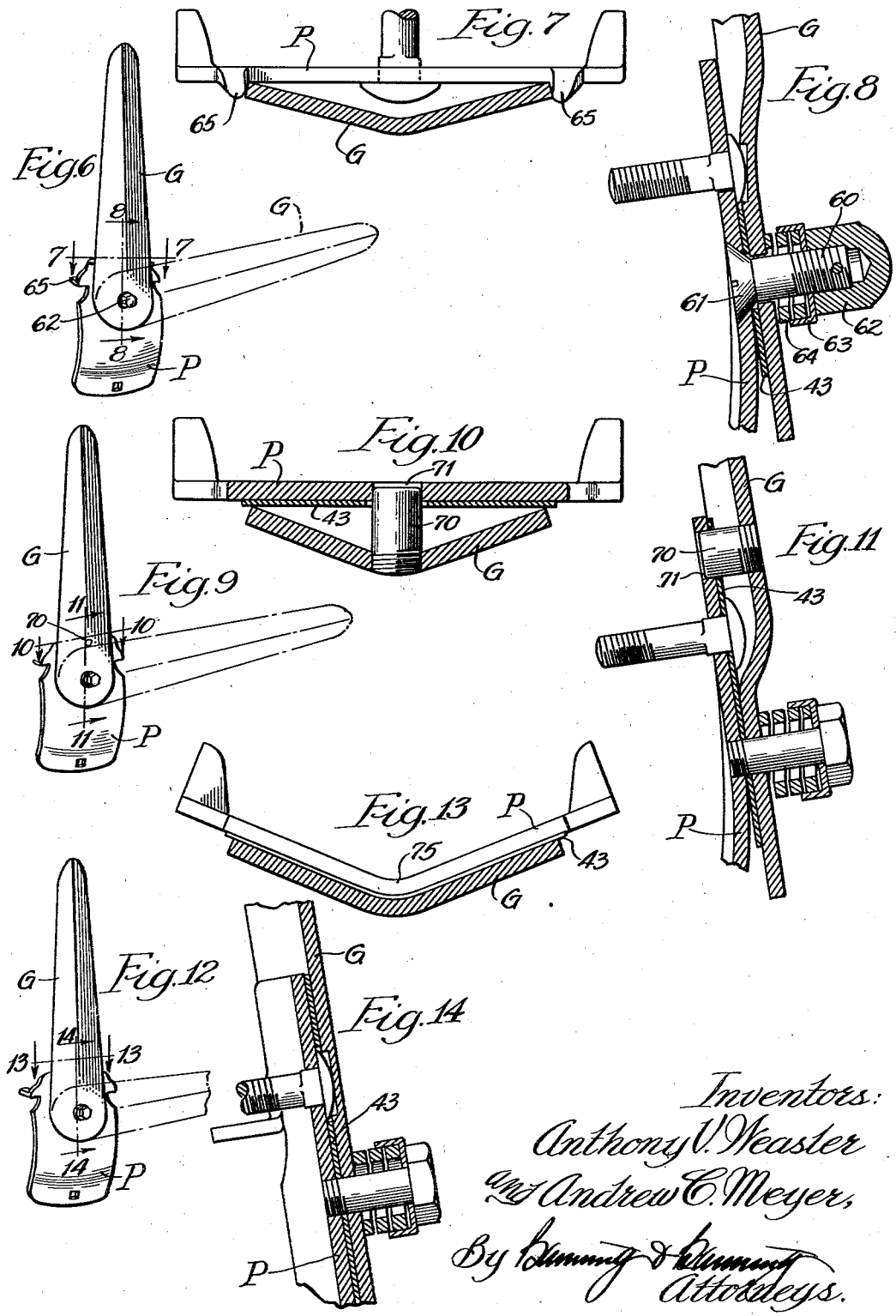

Patented Dec. 21, 1937

2,102,815

UNITED STATES PATENT OFFICE 2,102,815

GRILLE GUARD

Anthony V. Weasler and Andrew C. Meyer, West Bend, Wis., assignors to Pick Manufacturing Company, West Bend, Wis., a corporation of Wisconsin Application March 24, 1937, Serial No. 132,794

2 Claims. (Cl. 293—55)

This invention relates to a guard attachable to either bumper of an automobile to afford protection to parts thereof which are located above the bumper level. Such a guard when mounted upon the front bumper will protect the grille which is customarily provided to the front of the automobile radiator, and when mounted upon the rear bumper will protect the trunk or other fixtures upon the rear end of the automobile body just above the bumper level. It frequently happens that damage results from a relatively light impact which might have been absorbed by a protecting guard such as is disclosed herein.

The features of improvement which characterize the present guard reside in a pivotal mounting therefor by which the guard may be swung down, to a horizontal position if desired, so as to permit outward swinging movement of the protected grille or trunk door, as the case may be. At the present time it is common practice to mount the motor hood for swinging movement about a horizontal axis at a point adjacent the cowl; in consequence, the lower portion of the grille which lies to the front of the motor must advance forwardly and upwardly while executing this movement. Inasmuch as there may not be sufficient clearance between the grille and a guard which is mounted just forwardly thereof, we have sought by the improvements herein disclosed to provide a swinging mounting for the guard such as to permit the hood in its entirety to be swung to an upper position whenever access to the motor is desired. The same condition, requiring a down-swinging of the proximate guard, occurs when the trunk door at the rear of the automobile body is to be opened.

It is imperative that the guard mounting on the bumper shall under all conditions be sufficiently strong and rigid to furnish a substantial degree of protection. It is further important, in connection with a guard which is swingingly mounted, that adequate support be furnished to maintain the guard normally in a vertical protecting position. In the attainment of these objectives, we provide for the guard a swinging mounting such that it may, when required, be forced through a swinging movement to occupy a down position. The means by which these results are accomplished are simple indeed, are for the most part concealed from the view, and are fully effective for their intended purposes.

In the accompanying drawings certain suggestive embodiments of our invention are set forth in the manner following:

Figure 1 is a perspective view looking toward the rear end of an automobile body having a built-in trunk, the bumper which lies just below and to the rear of the trunk door being equipped with the swinging guard of this invention;

Fig. 2 is an enlarged view in longitudinal section, taken on line 2—2 of Fig. 1;

Fig. 3 is an enlarged view in transverse section taken on line 3—3 of Fig. 2;

Fig. 4 is a fragmentary view in elevation of the inner face of the guard and adjacent portion of the base plate upon which it is mounted;

Fig. 5 which is a view similar to Fig. 3 shows a modification in the pivotal mounting for the guard;

Fig. 6 is a view in perspective showing a grille guard of modified construction;

Fig. 7 is an enlarged transverse section taken on line 7—7 of Fig. 6;

Fig. 8 is a detail in vertical section taken on line 8—8 of Fig. 6;

Fig. 9 which is a view similar to Fig. 6 shows a further modified construction of grille guard;

Fig. 10 is an enlarged transverse section taken on line 10—10 of Fig. 9;

Fig. 11 is a detail in vertical section taken on line 11—11 of Fig. 9;

Fig. 12 which is a view similar to Figs. 6 and 9 shows a still further modified construction of grille guard;

Fig. 13 is a transverse section therethrough on an enlarged scale taken on line 13—13 of Fig. 12; and Fig. 14 is a detail in vertical section taken on line 14—14 of Fig. 12.

To illustrate a practical application of the present grille guard we have shown in Fig. 1 the rear end of an automobile body having a built-in trunk T with a rear door D hinged at 20 along the top. A handle 21 near the lower edge of the door is provided for releasing its catch (not shown) and for raising the door when access to the trunk interior is desired. Rearwardly of the automobile body, at a point just below the lower edge of the trunk door, is the usual bumper B in the form of a bar which is connected to supporting brackets 22 near its opposite ends. This bar may have a convex rearward face, together with a concave inner face, as shown in Figs. 2 and 4, or be otherwise contoured.

The present guard is designed for attachment to such a bumper, preferably at a point midway of its length. As shown, the guard comprises a base plate P which is vertically contoured to fit over and upon the outer face of the bumper, being of a length sufficient to extend slightly beyond the upper and lower edges thereof. In its lower region the base plate is formed with an opening 25, preferably square, to receive the correspondingly shaped shank of a carriage bolt 26 whose head 27 may lie upon the outer face of the base plate. Near the upper end of the base plate we have struck out from opposite edges thereof a pair of lugs 30 which extend laterally in the form of shoulders adapted to overlie the upper edge of the bumper bar B (see Fig. 2). At a point slightly above these shoulders the base plate is formed with a second opening 31, preferably square, to receive the correspondingly shaped shank 32 of a carriage bolt whose head 33 may lie upon the outer face of the base plate, as shown. By reason of the two shoulders thus provided the base plate is adapted to occupy a fixed position upon the bumper bar to which it may be secured with the aid of a cleat C in the form of a plate having a slight transverse bend 35 and openings 36 and 37, slotted lengthwise if desired, near its opposite ends for the reception of the bolt shanks 26 and 32. This cleat which lies adjacent the face of the bumper bar which is remote from that against which the base plate is fitted, is adapted to be clamped thereupon as by means of nuts 38 which are applied to the threaded ends of the two bolts. These nuts may be tightened to bear with pressure against spring washers 39 which exert a thrust against the cleat, thereby causing the base plate to be clamped firmly against the outer face of the bumper bar.

The base plate furnishes a mounting for a guard G which is swingingly connected thereto. As shown, the guard is in the form of an elongated plate which is flat, or substantially so, at its lower end where it overlaps the upper end of the base plate over whose outer face it is fitted. Through a pair of registering threaded openings in the base plate and lower flat portion of the guard is fitted a stud bolt 40 (see Fig. 2) whose head bears against the end of a cup washer 41 within which is confined a compression spring 42 exerting opposite thrusts against the washer and the guard. Surrounding the stud and fitted between the base plate and the guard is a leaf 43 of fiber or the like whose presence may be wholly concealed. This leaf prevents direct frictional contact between the guard and the base plate so that when relative rotary movements take place there will be no abrading or marring of the exterior face of the base plate which is desirably chrome-plated for decorative purposes.

Beyond the flat lower end of the guard, i. e. the area surrounding its pivotal connection with the base plate, the guard is preferably ridged for longitudinal reinforcement, the ridge in the construction shown being produced by an angled formation of the guard. This feature contributes to the beauty of the guard which in practice may be chromium plated with differing reflections on opposite sides of the ridge. In contour the guard is tapered gradually from its lower end to the top where it is rounded off in a symmetrical fashion.

By reason of the rigid or arched cross section of the guard, there is provided upon its inner face a shallow recess into which is fitted an offset head 45 which is formed along the top edge of the base plate. This head is provided with opposed ends 46 each adapted to enter a notch 47 that is formed on the inner face of the guard to engage with a vertical end wall 48 therein whereby to prevent swinging movement of the guard. The head remains engaged with these notches until the guard is pulled forwardly upon its pivotal mounting a distance sufficient to allow the head to clear when the guard is turned. During any such manipulations the spring 42 is required to undergo further compression in order that there may be disengagement of the head from the notches. Upon return of the guard to its vertical position, the head and notches will again interengage automatically in response to the thrust forces exerted by the spring.

In the construction just described the pivotal connection between the guard and the base plate includes a compression spring and confining cup washer therefor which is located on the outer face of the guard. It is possible to reverse the arrangement, as suggested in Fig. 5, where we show a bolt 50 having a cone head 51 which is countersunk on the outer face of the guard, the compression spring 42 and enclosing washer therefor 41 being disposed at the opposite end of the bolt adjacent the nut 52 which lies to the inside of the base plate in the space immediately over the bumper bar. It will be noted further that the cleat C shown in this figure is reversed so that the bend 35 lies outwardly instead of inwardly. This may be desirable with certain installations where the bumper contour is such that a better securement of the base plate can be effected this way.

Referring now to Figs. 6, 7 and 8, the swinging guard is substantially the same as has already been described. In this case, however, the pivotal mounting for the guard comprises a stud bolt 60 whose head 61 bears against the base plate. Upon the outer end of the bolt which is projected forwardly of the guard is fitted a cap nut 62 bearing against a cup washer 63 wherein is confined under compression the spring 64 which exerts thrust against the guard to hold it tightly against the base plate. A lock by which the guard is normally maintained in its upright position is provided by a pair of lugs 65 struck, if desired, from the base plate at a point adjacent its top edge and projected forwardly a slight distance so as to engage opposite edges of the guard when the latter is in upright position. To swing the guard it is necessary first that it be pulled forwardly a distance sufficient to clear these lugs, whereupon it will be free for rotary adjustment.

Referring now to Figs. 9, 10 and 11, the guard mounting is substantially the same as already described. At a point above its pivotal connection with the base plate, near the upper edge of the latter a stud 70 is affixed to the guard, being extended rearwardly therefrom a distance sufficient to enter a hole 71 which is formed in the base plate. The guard is prevented from swinging until the stud is disengaged from the hole, this being accomplished by a forward pull upon the guard sufficient to withdraw the stud.

Referring now to Figs. 12, 13 and 14, the guard which is pivotally connected to the base plate in substantially the same manner as already described is normally locked in an upright position by engagement therewith of the base plate whose upper end is ridged as at 75 in conformity with the cross sectional contour of the guard itself. As shown in Fig. 13, the ridge of one will tend to nest into the recess of the other under the influence of the compression spring. This relationship, however, may be broken by a forward pull upon the guard plate sufficient to produce a separation whereupon the guard plate may be swung upon its mounting.

The several constructions just described are all alike in that they each comprise a base plate which is pivotally connected the lower end of a guard which is adapted normally to be sustained in a vertical position with the aid of a spring in cooperation with positive locking elements. By slightly separating the guard from its base plate in response to a force which will further compress the spring, the locking elements will be ineffective to prevent swinging movement of the guard. When the need for down movement of the guard has passed, it may be returned by hand to its normal upright position where it is again automatically locked in place. The guard is normally sustained in its vertical operating position by the locking means already described, the bolt and spring being sufficiently heavy to resist an impact of substantial force should the guard be required to furnish protection to the adjacent automobile parts.

We claim:

1. A bumper guard comprising a base plate attachable to a bumper bar, a guard plate, and means providing a connection between the guard and base plates at two vertically spaced points, one of said connecting means comprising frictionally engaged opposed interfitting portions of said guard and base plates and the other a resilient pivotal mounting for the guard plate which yieldably retains said opposed interfitting portions in interlocked relationship, whereby said guard may be swung relative to said base plate by first moving said guard on its resilient mounting away from the base plate to disengage said opposed portions.

2. A bumper guard comprising a base plate adapted to be attached to a bumper bar, said base plate having a head portion, a guard plate having an axially movable pivotal mounting upon the base plate and stop means arranged to engage with the head of the base plate, and tension means holding the head of the guard and the stop means of the base plate in interfitting relationship for normally preventing swinging movement of the guard plate about its pivotal mounting.

ANTHONY V. WEASLER.
ANDREW C. MEYER.